United States Patent [19]
Schmidt

[11] Patent Number: 5,935,035
[45] Date of Patent: Aug. 10, 1999

[54] ELECTRO-MECHANICAL POWERTRAIN

[75] Inventor: Michael Roland Schmidt, Carmel, Ind.

[73] Assignee: General Motors Corporation, Detroit, Mich.

[21] Appl. No.: 09/103,851

[22] Filed: Jun. 24, 1998

[51] Int. Cl.$^6$ .............................. F16H 3/72; B60K 6/04
[52] U.S. Cl. ........................ 475/5; 180/65.2; 180/65.7
[58] Field of Search .................. 475/5; 477/2, 3; 180/65.2, 65.3, 65.6, 65.7

[56] References Cited

U.S. PATENT DOCUMENTS

| | | | |
|---|---|---|---|
| 1,081,643 | 12/1913 | Wills | 475/5 X |
| 1,870,076 | 8/1932 | Thomson | 475/5 X |
| 3,620,323 | 11/1971 | Maeda et al. | 475/5 X |
| 3,623,568 | 11/1971 | Mori | 180/65.2 X |
| 4,388,977 | 6/1983 | Bader | 180/65.7 X |
| 5,558,175 | 9/1996 | Sherman | 180/65.6 X |
| 5,558,588 | 9/1996 | Schmidt | 475/5 |
| 5,558,589 | 9/1996 | Schmidt | 475/5 |
| 5,558,595 | 9/1996 | Schmidt et al. | 477/3 |
| 5,571,058 | 11/1996 | Schmidt | 475/5 |
| 5,603,671 | 2/1997 | Schmidt | 475/5 |
| 5,713,814 | 2/1998 | Hara et al. | 477/5 |
| 5,730,675 | 3/1998 | Yamaguchi | 475/5 X |
| 5,730,676 | 3/1998 | Schmidt | 475/5 |
| 5,856,709 | 1/1999 | Ibaraki et al. | 475/5 X |

*Primary Examiner*—Charles A. Marmor
*Assistant Examiner*—Scott Lund
*Attorney, Agent, or Firm*—Donald F. Scherer; Dean L. Ellis

[57] ABSTRACT

An electro-mechanical powertrain has two motor/generator (m/g) units disposed in concentric coaxial arrangement with a plurality of planetary gearsets and a pair of friction brakes. An input shaft is driven by a prime mover through a selectively engageable clutch. The motor/generator units are controlled in combination with the planetary gearset, the prime mover and an electrical source (batteries) to provide a two-mode, input split powertrain.

2 Claims, 2 Drawing Sheets

ELECTRO-MECHANICAL POWERTRAIN

TECHNICAL FIELD

This invention relates to hybrid electro-mechanical powertrains.

BACKGROUND OF THE INVENTION

Hybrid electro-mechanical transmissions are known to improve the exhaust emissions of a vehicle in that the electrical power reduces the fossil fuel used in the prime mover. Also, present in the prior art are input split, parallel hybrid type transmissions, one of which is disclosed in U.S. Pat. No. 5,558,588, assigned to the assignee of the present invention.

The hybrid electro-mechanical transmissions are constructed such that the engine and electric motor drives or generators are combined at the input to provide an input split between the utilization of the power sources. The power from the prime mover and the motor/generator sets is combined in one or more planetary gearsets to provide an output power which is then utilized to drive a vehicle. The vehicle can be as large as an earthmover or tank, and as small as a passenger car.

SUMMARY OF THE INVENTION

It is an object of the present invention to provide an improved input split hybrid electromechanical power transmission wherein coaxial arrangement of the electrical and planetary gearsets is provided.

In one aspect of the present invention, the motor/generator units are disposed radially outward of the planetary gearsets, thus providing a compact axial arrangement which is favorable in many vehicles.

In another aspect of the invention, the motor/generator units surround four planetary gear units and two selectively engageable friction devices to provide two modes of input split power operation.

In yet another aspect of the invention, the motor/generator units are controlled by an electrical control unit which is operable to distribute electrical power between the units and also to distribute electrical power from a battery pack to either or both of the units.

DESCRIPTION OF THE PREFERRED EMBODIMENT

Figure 1:
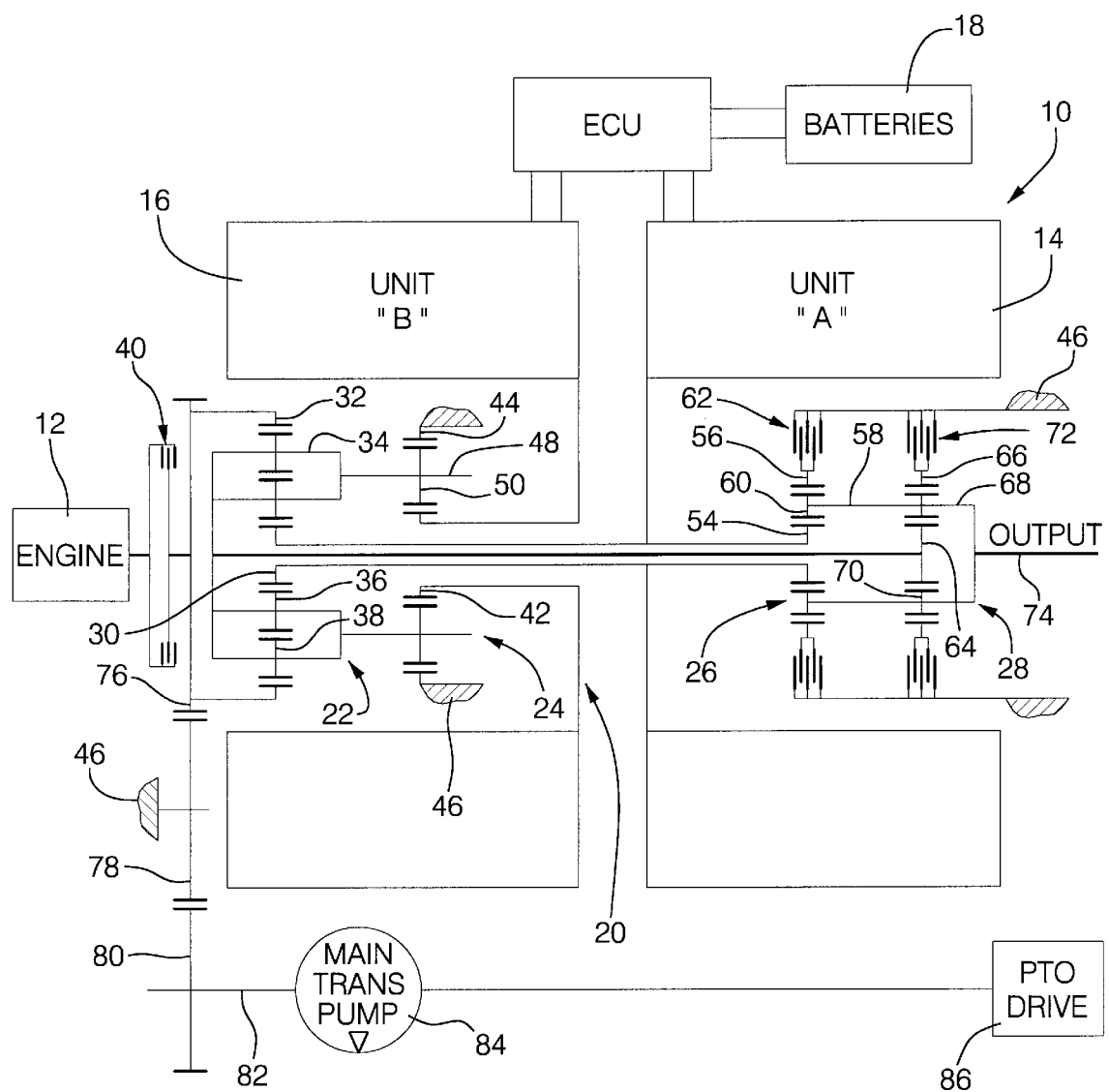
FIG. 1 is a schematic representation of a powertrain incorporating the present invention.
Figure 2:
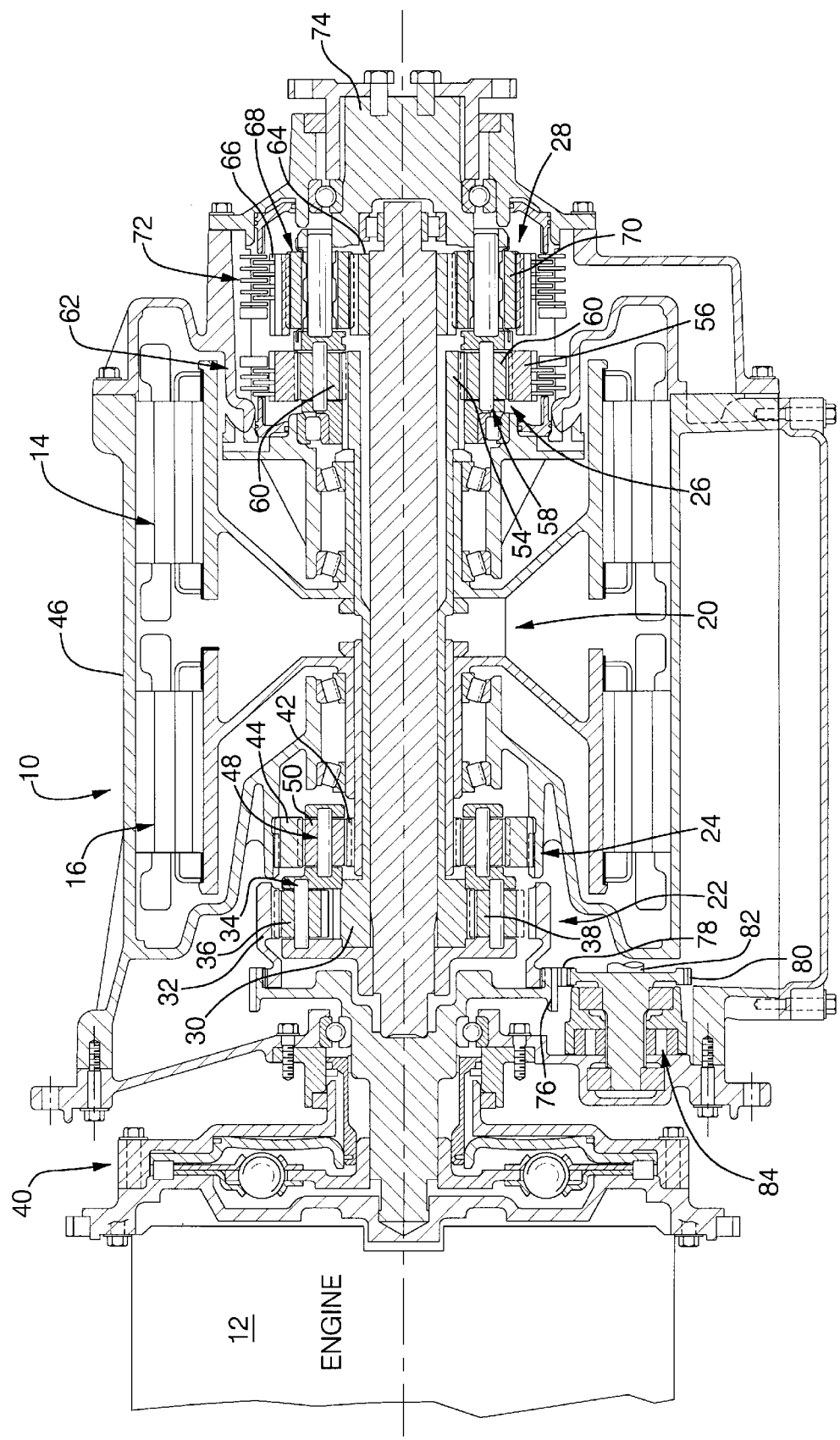
FIG. 2 is a cross-sectional elevational view of an electromechanical hybrid power transmission incorporating the present invention.

Referring to the drawings, wherein like characters represent the same or corresponding parts throughout the several views, there is seen in the drawings a hybrid powertrain, generally designated 10, including an engine 12, a motor/generator (M/G) unit 14, a motor/generator (M/G) unit 16, an electrical control unit (ECU), a battery pack 18, and a planetary gear arrangement 20.

The planetary gear arrangement 20 includes four planetary gearsets 22, 24, 26 and 28. The planetary gearset 22 includes a sun gear 30, a ring gear 32 and a carrier assembly 34, which is comprised of a plurality of rotatably mounted meshing pinion gears 36 and 38. Pinion gears 36 mesh with the sun gear 30 and the pinion gears 38 mesh with the ring gear 32. As is well known with such units, the rotation of the ring gear will result in forward rotation of the sun gear if the carrier assembly 34 is held stationary. The ring gear 32 is drivingly connected through a conventional flywheel assembly and engine disconnect clutch 40. Thus, the ring gear 32 will be rotated whenever the device 40 is actuated and the engine 12 is in operation.

The planetary gearsets 24, 26 and 28 are all single pinion simple planetaries. The planetary gearset 24 has a sun gear 42 and a ring gear 44 which is held stationary by a portion of a transmission housing 46. The planetary gear arrangement 20 also includes a carrier assembly 48 on which is rotatably mounted a plurality of pinions 50 meshing with the sun gear 42 and the ring gear 44. The carrier 48 is connected integrally with the carrier 34 and the sun gear 42 is drivingly connected with the motor/generator unit 16.

The planetary gearset 26 has a sun gear 54, a ring gear 56 and a carrier assembly 58 on which is rotatably mounted a plurality of pinions 60 meshing with the sun gear 54 and the ring gear 56. The ring gear 56 is selectively connectable with the transmission housing 46 through a conventional fluid operated friction brake 62.

The sun gear 54 is continuously drivingly connected with both the sun gear 30 of planetary gearset 22 and with the motor/generator unit 14. The planetary gearset 28 has a sun gear 64, a ring gear 66 and a carrier assembly 68 on which is rotated a plurality of pinion gears 70 meshing with the sun gear 64 and the ring gear 66. The ring gear 66 is operatively connected with a conventional fluid operated friction brake 72 which, in turn, is connected to the transmission housing 46.

The carrier assemblies 58 and 68 are interconnected and also connected with a transmission output shaft 74 which is adapted to deliver power from the engine 12 and the motor/generator units 14 and 16 to a conventional set of vehicle drive wheels or drive tracks. The engine 12 is also connected with a drive gear 76 which is operable to drive through an idler gear 78 to a gear 80.

Gear 80 is drivingly connected with a shaft 82 which will drive a hydraulic pump 84 and a conventional power takeoff unit 86. The pump 84 is operable to provide hydraulic fluid to control the engagement and disengagement of the brakes 62 and 72, and also control engagement of the clutch 40. The clutch 40 can be disengaged to release the engine when an all electric drive is desired.

The powertrain 10 operates in two distinct modes and has a synchronous changeover point from the first mode to the second mode. During the first mode of operation, the brake 72 is engaged, thereby grounding the ring gear 66, such that power delivered to the sun gear 64 will be delivered to the output shaft 74 at an underdrive ratio. The power delivered to the sun gear 64 is introduced thereto from the carrier assemblies 48 and 34, which are continuously drivingly connected with the sun gear 64.

During the first mode of operation, the motor/generator unit 14 operates as a generator while the motor/generator unit 16 operates as a motor. Through a first portion of the first mode, the battery power from units 18 is zero, thus the initial acceleration of the vehicle is without the use of batteries 18. After the initial acceleration, the batteries contribute between zero and full battery power, and for the last portion of the operating first mode, the batteries contribute full power. Thus, during this portion of operation, both the engine and the batteries are contributing maximum power. This occurs, of course, only when maximum vehicle acceleration and performance is desired. At lesser engine throttles, which might occur at highway cruising or urban cruising, the battery contribution is considerably less and during some operating condition, the battery will be charged by either of the motor/generator units 14 or 16.

The changeover or interchange from the first mode to the second mode occurs at a synchronous speed at both motor/generator unit 14 and 16. The changeover occurs with the exhausting or disengagement of the brake 72 and the engagement of the brake 62. The engagement of the brake 62 establishes the ring gear 56 as a reaction unit, such that power delivered from the sun gear 54 is directed through the carrier assembly 58 to the output shaft 74.

During the first portion of the second mode, the motor/generator unit 16 operates as the generator while the motor/generator unit 14 operates as a motor. During a second portion of the second mode, both motor/generator units 14 and 16 operate as motors under the full power condition drawing power from the battery 18. For the final and maximum speed portion of the second mode, the motor/generator unit 14 operates as a generator and the motor/generator unit 16 operates as a motor.

Reverse operation is attained by conditioning the planetary gear arrangement 20 for the low ratio and rotating the motor/generator unit 16 in reverse. The operation can be performed by using the battery power or engine power or both. The ECU will provide the proper electrical control to the motor/generators 14 and 16 when reverse operation is commanded by the operator.

The following numbers are given as an example of one operating embodiment:

| Planetary Gearset | 22 | 24 | 26 | 28 |
|---|---|---|---|---|
| Ring Gear Teeth | 141 | 116 | 114 | 95 |
| Sun Gear Teeth | 62 | 60 | 66 | 55 |
| Ring/Sun Ratio | 2.274 | 1.933 | 1.727 | 1.727 |

The engine provides a maximum of 194 horsepower at 1,950 rpm. The battery 18 provides a maximum 55 horsepower. The ECU is operable to distribute the power from the battery to the respective motor/generator units 14 and 16 and also to distribute power between the two motor/generator units when one is operating as a motor and the other as a generator. The motor/generator units 16 and 14 are high speed low torque units which are desirable since the power losses become minimal with these types of units. Also, it is the use of high speed low torque units that permit the planetary gear assemblies to be disposed radially inward and concentric with the motor/generator units 14 and 16.

The mass of the motor/generator units is reduced considerably compared to prior units, in particular those disclosed in U.S. Pat. No. 5,558,588. One other major difference that might be noted between the present invention and the above mentioned U.S. patent is that at least two of the friction devices of the prior art are rotating clutches and one friction device is a stationary brake. In the present invention, both friction devices are stationary brakes. This structure also shortens the axial length of the transmission through the elimination of rotating seals which are necessary to feed clutch type friction devices.

It should also be noted that the present invention utilizes four planetary gearsets as opposed to three planetary gearsets of the prior art, however, the use of the gearsets also provide a more compact unit in which the gear members can be located concentric and radially inward of the motor/generator units 14 and 16.

Utilizing the above set forth data, the motor/generator unit 14 will operate between 1,950 rpm and a maximum of 3,905 rpm during the first mode of operation, while the motor/generator unit 16 will operate from zero rpm through 5,720 rpm at which time the brake 72 is disengaged and the brake 62 is engaged. The speed of the motor/generator units 14 and 16 remains constant during the interchange of these friction devices.

The friction device interchange occurs during maximum performance, when the motor/generator unit 14 is rotating at 1,950 rpm and the motor/generator unit 16 is rotating at 5,720 rpm. During the second mode of operation, the motor/generator unit 14 speed increases from 1,950 to 5,854 rpm while the speed of motor/generator unit 14 decreases from 5,720 to zero and then to a negative value of −3,267.

When the motor/generator unit 16 is at zero speed, the most efficient operating point from a mechanical standpoint occurs. At this point, the sun gear 42 is held stationary and since the ring gear 44 is stationary, the carrier 48 is also stationary as is the carrier 34. Thus, it can be seen that all of the power from the engine 12 is directly connected through the planetary gearset 22 to the sun gear 54. The motor/generator unit 14 is also directly connected into the sun gear unit 54 so that all of the power of both the engine and battery is being directly connected to the planetary gearset 26.

With the data values given above, this mechanical point will occur at approximately 64 mph. Also, with this set of values, the changeover or interchange point from mode one to mode two occurs at approximately 21.5 mph and the maximum output speed of the vehicle is approximately 65 mph. These, of course, are values attained at maximum performance settings. Values at less than full engine throttle will, of course, be reduced such that the mechanical speed point can be adjusted downward from 64 mph to a value commensurate with urban operation and also a lesser speed for highway operation.

From the above description, it should be apparent that a much more compact in axial dimension transmission is provide which permits the installation of the hybrid transmission in a plurality of vehicles, wherein the axial dimension of the powertrain might intrude into the passenger compartment requiring the utilization of space otherwise available to the passengers.

I claim:

1. An input split hybrid electromechanical transmission comprising:

an input member for receiving power input from a prime mover power source;

an output member for delivering power from the transmission;

a first motor/generator;

a second motor/generator coaxially aligned with said first motor/generator;

energy storage means for interchanging electrical power with said first and second motor/generators;

control means for regulating the electrical power interchange between said storage means and said first and second motor/generators and also regulating electrical power interchange between said first and second motor/generators;

a planetary gear arrangement including first, second, third and fourth coaxial aligned planetary gear sets, each planetary gear set including first, second and third members comprising a sun gear member, a ring gear member and a planetary carrier assembly member, said planetary gear arrangement being coaxial with and radially inward of said first and second motor/generators;

said first member of said first planetary gear set being continuously connected with said input member; said first member of said second planetary gear set being continuously connected with said second motor/generator; said first member of said third planetary gear set and said second member of said first planetary gear set being continuously connected with said first motor/generator; said third member of said first planetary gear set, said second member of said second planetary gear set and said first member of said fourth planetary gear set being continuously connected; said second member of both said third planetary gear set and said fourth planetary gear set being continuously connected with said output member; said third member of both said third planetary gear set and said fourth planetary gear set being connected with respective selectively actuated brake mechanisms; and said third member of said second planetary gear set being continuously held stationary.

2. An input split hybrid electromechanical transmission comprising:

an input member for receiving power input from a prime mover power source;

an output member for delivering power from the transmission;

a first motor/generator;

a second motor/generator coaxially aligned with said first motor/generator;

energy storage means for interchanging electrical power with said first and second motor/generators;

control means for regulating the electrical power interchange between said storage means and said first and second motor/generators and also regulating electrical power interchange between said first and second motor/generators;

a planetary gear arrangement disposed radially inward of and coaxially aligned with said first and second motor/generators, said planetary gear arrangement including first, second, third and fourth planetary gear sets, each planetary gear set comprising a sun gear member, a ring gear member and a carrier assembly member;

said ring gear member of said first planetary gear set being continuously connected with said input member; said sun gear member of said second planetary gear set being continuously connected with said second motor/generator; said sun gear member of said third planetary gear set and said sun gear member of said first planetary gear set being continuously connected with said first motor/generator; said carrier assembly member of said first planetary gear set, said carrier assembly member of said second planetary gear set and said sun gear member of said fourth planetary gear set being continuously connected; said carrier assembly member of both said third planetary gear set and said fourth planetary gear set being continuously connected with said output member; said ring gear member of both said third planetary gear set and said fourth planetary gear set being connected with respective selectively actuated brake mechanisms; and said ring gear member of said second planetary gear set being continuously held stationary.

* * * * *